US008688617B2

(12) United States Patent
Morgan et al.

(10) Patent No.: US 8,688,617 B2
(45) Date of Patent: Apr. 1, 2014

(54) STATISTICAL WORD BOUNDARY DETECTION IN SERIALIZED DATA STREAMS

(75) Inventors: Matthew A. Morgan, Earlysville, VA (US); James R. Fisher, Crozet, VA (US)

(73) Assignee: Associated Universities, Inc., Washington, DC (US)

( * ) Notice: Subject to any disclaimer, the term of this patent is extended or adjusted under 35 U.S.C. 154(b) by 292 days.

(21) Appl. No.: 13/186,739

(22) Filed: Jul. 20, 2011

(65) Prior Publication Data
US 2012/0023059 A1    Jan. 26, 2012

Related U.S. Application Data

(60) Provisional application No. 61/367,733, filed on Jul. 26, 2010, provisional application No. 61/368,422, filed on Jul. 28, 2010.

(51) Int. Cl.
*G06N 5/04*      (2006.01)
*H03M 1/12*      (2006.01)

(52) U.S. Cl.
USPC ............................................ 706/52; 341/155

(58) Field of Classification Search
None
See application file for complete search history.

(56) References Cited

U.S. PATENT DOCUMENTS

| | | | | |
|---|---|---|---|---|
| 5,081,654 A * | 1/1992 | Stephenson et al. | ........... | 375/368 |
| 6,038,536 A * | 3/2000 | Haroun et al. | ................ | 704/500 |
| 6,222,380 B1 * | 4/2001 | Gerowitz et al. | ............... | 326/38 |
| 6,459,392 B1 * | 10/2002 | Haggar et al. | .................. | 341/87 |
| 6,504,863 B1 * | 1/2003 | Hellmark | ...................... | 375/219 |
| 6,653,957 B1 * | 11/2003 | Patterson et al. | ............. | 341/100 |
| 6,795,515 B1 * | 9/2004 | Riedle et al. | .................. | 375/355 |
| 7,064,690 B2 * | 6/2006 | Fowler et al. | ................. | 341/101 |
| 7,245,654 B2 * | 7/2007 | Chang et al. | ................... | 375/150 |
| 7,409,616 B1 * | 8/2008 | Sardi et al. | ..................... | 714/738 |
| 7,440,532 B1 * | 10/2008 | Chang | ........................... | 375/372 |
| 7,728,738 B2 * | 6/2010 | Cameron | ........................ | 341/50 |
| 7,965,215 B2 * | 6/2011 | Rofougaran | .................. | 341/155 |
| 2003/0002565 A1 * | 1/2003 | Kockmann | .................... | 375/145 |
| 2003/0048209 A1 * | 3/2003 | Buchanan et al. | ............. | 341/100 |
| 2005/0207280 A1 * | 9/2005 | Fowler et al. | ................... | 368/10 |
| 2005/0219083 A1 * | 10/2005 | Boomer et al. | ............... | 341/100 |
| 2005/0231399 A1 * | 10/2005 | Fowler et al. | ................. | 341/100 |
| 2009/0231171 A1 * | 9/2009 | Boomer et al. | ............... | 341/100 |
| 2009/0265166 A1 * | 10/2009 | Abe | ............... | 704/201 |
| 2010/0302076 A1 * | 12/2010 | Cameron | ........................ | 341/50 |
| 2011/0289083 A1 | 11/2011 | Fisher | | |
| 2011/0289084 A1 | 11/2011 | Fisher | | |
| 2011/0289094 A1 | 11/2011 | Fisher | | |
| 2012/0023059 A1 | 1/2012 | Morgan | | |

OTHER PUBLICATIONS

Morgan M., et al., "Word-Boundary Detection in a Serialized, Gaussian-Distributed, White-Noise Data Stream", Electronics Division Technical Note No. 213, National Radio Astronomy Observatory Charlottesville, Virginia, Oct. 13, 2009.*
Carlson, B. et al., "Data Transmission and Signal Processing for the Expanding Very Large Array (EVLA)," Proceedings of the 28th URSI General Assembly, New Delhi, 2005.
PCT Search Report for PCT/US2011/044657, dated Dec. 9, 2011.
PCT Patentability Report for PCT/US2011/044657, dated Dec. 9, 2011.

* cited by examiner

*Primary Examiner* — Jeffrey A Gaffin
*Assistant Examiner* — Dave Misir
(74) *Attorney, Agent, or Firm* — Remenick PLLC

(57) ABSTRACT

Methods, systems, and devices using an algorithm that consists of scoring the bits in the data stream with a periodicity of N, where N is the word-length in bits, and then selecting as the most significant bit the one which receives the highest score after some large number of samples are disclosed. The condition under which bit $b_k$ receives a point depends on the binary format.

55 Claims, 8 Drawing Sheets

| PROBABILITY BINS | SIGN-MAGNITUDE | STRAIGHT BINARY | TWO's COMPLEMENT |
|---|---|---|---|
| $=\frac{1}{2}-\frac{1}{2}\text{erf}(\frac{15}{16}a)$ | 1 1 1 1 1 | 1 1 1 1 1 | 0 1 1 1 1 |
| $=\frac{1}{2}\text{erf}(\frac{15}{16}a)-\frac{1}{2}\text{erf}(\frac{7}{8}a)$ | 1 1 1 1 0 | 1 1 1 1 0 | 0 1 1 1 0 |
| $=\frac{1}{2}\text{erf}(\frac{7}{8}a)-\frac{1}{2}\text{erf}(\frac{13}{16}a)$ | 1 1 1 0 1 | 1 1 1 0 1 | 0 1 1 0 1 |
| $=\frac{1}{2}\text{erf}(\frac{13}{16}a)-\frac{1}{2}\text{erf}(\frac{3}{4}a)$ | 1 1 1 0 0 | 1 1 1 0 0 | 0 1 1 0 0 |
| $=\frac{1}{2}\text{erf}(\frac{3}{4}a)-\frac{1}{2}\text{erf}(\frac{11}{16}a)$ | 1 1 0 1 1 | 1 1 0 1 1 | 0 1 0 1 1 |
| $=\frac{1}{2}\text{erf}(\frac{11}{16}a)-\frac{1}{2}\text{erf}(\frac{5}{8}a)$ | 1 1 0 1 0 | 1 1 0 1 0 | 0 1 0 1 0 |
| $=\frac{1}{2}\text{erf}(\frac{5}{8}a)-\frac{1}{2}\text{erf}(\frac{9}{16}a)$ | 1 1 0 0 1 | 1 1 0 0 1 | 0 1 0 0 1 |
| $=\frac{1}{2}\text{erf}(\frac{9}{16}a)-\frac{1}{2}\text{erf}(\frac{1}{2}a)$ | 1 1 0 0 0 | 1 1 0 0 0 | 0 1 0 0 0 |
| $=\frac{1}{2}\text{erf}(\frac{1}{2}a)-\frac{1}{2}\text{erf}(\frac{7}{16}a)$ | 1 0 1 1 1 | 1 0 1 1 1 | 0 0 1 1 1 |
| $=\frac{1}{2}\text{erf}(\frac{7}{16}a)-\frac{1}{2}\text{erf}(\frac{3}{8}a)$ | 1 0 1 1 0 | 1 0 1 1 0 | 0 0 1 1 0 |
| $=\frac{1}{2}\text{erf}(\frac{3}{8}a)-\frac{1}{2}\text{erf}(\frac{5}{16}a)$ | 1 0 1 0 1 | 1 0 1 0 1 | 0 0 1 0 1 |
| $=\frac{1}{2}\text{erf}(\frac{5}{16}a)-\frac{1}{2}\text{erf}(\frac{1}{4}a)$ | 1 0 1 0 0 | 1 0 1 0 0 | 0 0 1 0 0 |
| $=\frac{1}{2}\text{erf}(\frac{1}{4}a)-\frac{1}{2}\text{erf}(\frac{3}{16}a)$ | 1 0 0 1 1 | 1 0 0 1 1 | 0 0 0 1 1 |
| $=\frac{1}{2}\text{erf}(\frac{3}{16}a)-\frac{1}{2}\text{erf}(\frac{1}{8}a)$ | 1 0 0 1 0 | 1 0 0 1 0 | 0 0 0 1 0 |
| $=\frac{1}{2}\text{erf}(\frac{1}{8}a)-\frac{1}{2}\text{erf}(\frac{1}{16}a)$ | 1 0 0 0 1 | 1 0 0 0 1 | 0 0 0 0 1 |
| $=\frac{1}{2}\text{erf}(\frac{1}{16}a)$ | 1 0 0 0 0 | 1 0 0 0 0 | 0 0 0 0 0 |
| $=\frac{1}{2}\text{erf}(\frac{1}{16}a)$ | 0 0 0 0 0 | 0 1 1 1 1 | 1 1 1 1 1 |
| $=\frac{1}{2}\text{erf}(\frac{1}{8}a)-\frac{1}{2}\text{erf}(\frac{1}{16}a)$ | 0 0 0 0 1 | 0 1 1 1 0 | 1 1 1 1 0 |
| $=\frac{1}{2}\text{erf}(\frac{3}{16}a)-\frac{1}{2}\text{erf}(\frac{1}{8}a)$ | 0 0 0 1 0 | 0 1 1 0 1 | 1 1 1 0 1 |
| $=\frac{1}{2}\text{erf}(\frac{1}{4}a)-\frac{1}{2}\text{erf}(\frac{3}{16}a)$ | 0 0 0 1 1 | 0 1 1 0 0 | 1 1 1 0 0 |
| $=\frac{1}{2}\text{erf}(\frac{5}{16}a)-\frac{1}{2}\text{erf}(\frac{1}{4}a)$ | 0 0 1 0 0 | 0 1 0 1 1 | 1 1 0 1 1 |
| $=\frac{1}{2}\text{erf}(\frac{3}{8}a)-\frac{1}{2}\text{erf}(\frac{5}{16}a)$ | 0 0 1 0 1 | 0 1 0 1 0 | 1 1 0 1 0 |
| $=\frac{1}{2}\text{erf}(\frac{7}{16}a)-\frac{1}{2}\text{erf}(\frac{3}{8}a)$ | 0 0 1 1 0 | 0 1 0 0 1 | 1 1 0 0 1 |
| $=\frac{1}{2}\text{erf}(\frac{1}{2}a)-\frac{1}{2}\text{erf}(\frac{7}{16}a)$ | 0 0 1 1 1 | 0 1 0 0 0 | 1 1 0 0 0 |
| $=\frac{1}{2}\text{erf}(\frac{9}{16}a)-\frac{1}{2}\text{erf}(\frac{1}{2}a)$ | 0 1 0 0 0 | 0 0 1 1 1 | 1 0 1 1 1 |
| $=\frac{1}{2}\text{erf}(\frac{5}{8}a)-\frac{1}{2}\text{erf}(\frac{9}{16}a)$ | 0 1 0 0 1 | 0 0 1 1 0 | 1 0 1 1 0 |
| $=\frac{1}{2}\text{erf}(\frac{11}{16}a)-\frac{1}{2}\text{erf}(\frac{5}{8}a)$ | 0 1 0 1 0 | 0 0 1 0 1 | 1 0 1 0 1 |
| $=\frac{1}{2}\text{erf}(\frac{3}{4}a)-\frac{1}{2}\text{erf}(\frac{11}{16}a)$ | 0 1 0 1 1 | 0 0 1 0 0 | 1 0 1 0 0 |
| $=\frac{1}{2}\text{erf}(\frac{13}{16}a)-\frac{1}{2}\text{erf}(\frac{3}{4}a)$ | 0 1 1 0 0 | 0 0 0 1 1 | 1 0 0 1 1 |
| $=\frac{1}{2}\text{erf}(\frac{7}{8}a)-\frac{1}{2}\text{erf}(\frac{13}{16}a)$ | 0 1 1 0 1 | 0 0 0 1 0 | 1 0 0 1 0 |
| $=\frac{1}{2}\text{erf}(\frac{15}{16}a)-\frac{1}{2}\text{erf}(\frac{7}{8}a)$ | 0 1 1 1 0 | 0 0 0 0 1 | 1 0 0 0 1 |
| $=\frac{1}{2}-\text{erf}(\frac{15}{16}a)$ | 0 1 1 1 1 | 0 0 0 0 0 | 1 0 0 0 0 |
| | $b_{N-1} \ldots b_0$ | $b_{N-1} \ldots b_0$ | $b_{N-1} \ldots b_0$ |

$V_{max}$ and $V_{min}$ mark the top and bottom of the probability distribution shown at left.

FIG. 2

STATISTICAL WORD BOUNDARY DETECTION IN SERIALIZED DATA STREAMS

REFERENCE TO RELATED APPLICATIONS

This application claims priority to U.S. Provisional Application Nos. 61/367,733, filed Jul. 26, 2010, and 61/368,422, filed Jul. 28, 2010, both of which are entitled "Statistical Word Boundary Detection in Serialized Data Streams," and are hereby specifically and entirely incorporated by reference.

RIGHTS IN THE INVENTION

This invention was made with United States government support under Cooperative Agreement Nos. AST-0956545 and AST-0223851, between the National Science Foundation and Associated Universities, Inc., and, accordingly, the United States government has certain rights in this invention.

BACKGROUND

1. Field of the Invention

The invention is directed to methods and systems of assessing data streams and, in particular, to methods and systems of detecting word boundaries in data streams.

2. Background of the Invention

In the broad, well-established field of wide bandwidth data transmission, analog links are slowly being replaced by digital links in recognition of their superior stability, fidelity, and robustness in the presence of a wide range of environmental conditions. Analog links remain a preferred solution only in the most demanding cases where a lot of data is collected and the resources available for digital hardware is severely constrained. Conventional digital links, though well-crafted and very reliable, depend on industry-standardized formatting at the transmitter which can only be implemented using complex, high-speed digital logic devices, such as a microprocessor or VLSI circuits.

The following are examples of the current state-of-the-art in analog fiber optic links: PSI-1600 Series Microwave Photonic Links by Photonics Systems Inc., XiMod 25/30 GHz fiber optic links by Linear Photonics, and SATCOM Fiber Optic Products by Miteq Like all analog link technologies, their performance is sensitive to environmental factors such as temperature, vibration, and cable flexure, and they degrade the signal irrecoverably due to the fundamental properties of the medium, such as dispersion and dissipative loss.

The following provides an example of the current state-of-the-art in digital fiber optic links: B. Carlson, P. Dewdney, P. Napier, and D. Fort, "Data Transmission and Signal Processing for the Expanded Very Large Array (EVLA)," *Proceedings of the 28th URSI General Assembly*, New Delhi, 2005. Though robust and reliable in the presence of most environmental perturbations, the implementation necessarily requires a great deal of auxiliary hardware in the receiver cabin—a difficult space where resources are extremely limited.

SUMMARY OF THE INVENTION

The present invention overcomes the problems and disadvantages associated with current strategies and designs and provides new systems and methods of statistically determining word boundaries in a data stream.

One embodiment of the invention is directed to method. The method comprises one or more processors obtaining a data set, wherein the data set comprises words, and the words comprise symbols, inferring boundaries between words using statistical properties of the data set, and outputting the data set with the word boundaries identified.

In a preferred embodiment, the number of symbols per word is constant and the number of symbols per word is inferred using the statistical properties of the data set. In another embodiment, the number of symbols per word is dynamic and the number of symbols per word is inferred using the statistical properties of the data set.

Preferably, the data set is in serial format. The serial data is preferably in one of little-endian or in big-endian order. In preferred embodiments, the method may also comprise converting the serial data to parallel data. In preferred embodiments, the method may also comprise realigning the parallel data by one of a shift, a rotation, a delay, and a buffer.

Preferably, the symbols are binary digits or bits. The format of the words is preferably one of sign plus magnitude, straight binary, offset binary, two's complement, one's complement, floating point, and Gray code.

In preferred embodiments, the words are of a known fixed length. The data set may be divided into groups of symbols of the same length as the words. The method preferably comprises assigning a score to the symbol positions in each group based on a Boolean logical test. Preferably, the scores are accumulated over a finite number of groups.

Preferably, the method further comprises identifying a single symbol position by the accumulated scores, and inferring that the single symbol position occupies a single position within the words of the data set. The inferred position is preferably one of the most significant digit, the least significant digit, and the sign digit.

Preferably, the data set comprises binary words in sign plus magnitude format, the Boolean logical test is $$(b_k=1) \wedge (b_{k-1}=0), \text{ and}$$

$b_k$ is the value of bit k, $b_{k-1}$ is the value of an adjacent bit, and the bit position with the highest final score is inferred to be the sign digit.

In another embodiment, the data set comprises binary words in straight binary or offset binary format, the Boolean logical test is $$b_k \neq b_{k-1}, \text{ and}$$

$b_k$ is the value of bit k, $b_{k-1}$ is the value of an adjacent bit, and the bit position with the highest final score is inferred to be the most significant bit.

In another embodiment, the data set comprises binary words in two's complement format, the Boolean logical test is $$(b_k=b_{k-1}) \wedge (b_k \neq b_{k+1}); \text{ and}$$

$b_k$ is the value of bit k, wherein $b_{k-1}$ and $b_{k+1}$ are the values of adjacent bits, and the bit position with the highest final score is inferred to be the most significant bit.

In a preferred embodiment, the method further comprises transmitting the data set through a medium. The medium may be one of a transmission line, an optical fiber, a coaxial cable, and free space. Preferably, the medium is a waveguide. The waveguide may be one of rectangular, circular, elliptical, or ridged.

In a preferred embodiment, the power spectral density of the words is substantially equal to the power spectral density of white noise. Preferably, the probability distribution of the words is substantially Gaussian. Preferably, the words are samples output by an Analog to Digital Converter (ADC).

In preferred embodiments, the words from multiple sources are interleaved. The method preferably further comprises collecting the data set one of actively and passively. The data set may be the output of one of a SONAR, a RADAR, a radiometer, a reflectometer, and a polarimeter.

Another embodiment of the invention is directed to a system comprising a processor. The system obtains a data set comprised of words, and the words comprised of symbols, infers boundaries between words using statistical properties of the data set, and outputs the data set with the word boundaries identified.

In a preferred embodiment, the system further comprises a serializer and/or an optical fiber. Preferably, the system further comprises a data transmission link having a transmit end and a receive end. The transmit end preferably comprises one or more of an Analog to Digital Converter (ADC), a serializer, a laser driver, and a laser. The receive end preferably comprises one or more of a photodiode, a transimpedance amplifier, a deserializer, an Application Specific Integrated Circuit (ASIC), a Complex Programmable Logic Device (CPLD), and a Field Programmable Gate Array (FPGA).

Preferably, the system is one of a SONAR, a RADAR, a radiometer, a reflectometer, a polarimeter, a wireless transmitter, a cell phone, an imaging camera, a transmitter, a receiver, and a transceiver. Preferably, the system further comprises one of a spectrometer and a correlator. Preferably, the system further comprises a data recorder.

Another embodiment of the invention is directed to an Analog to Digital Converter (ADC). The ADC comprises an analog input, and a digital output. The output is in serial format and the output is not encoded for word alignment.

Preferably, the type of ADC is one of direct conversion or flash, successive approximation, ramp-compare, Wilkinson, Integrating, delta-encoded, pipeline, Sigma-Delta, time interleaved, and time-stretch. Preferably the ADC output medium is one of copper, optical fiber, and free space. In a preferred embodiment, the bit resolution is adjustable.

Another embodiment of the invention is directed to a method of identifying word boundaries. The method comprises a device obtaining a serial data stream, wherein the data stream comprises words, and the words comprise symbols, inferring the boundaries between words using statistical properties of the data stream, and outputting the data stream with the word boundaries identified, wherein the device is one of a deserializer, a demultiplexer, and a universal asynchronous receiver/transmitter (UART).

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which:

FIG. 2 is a diagram of the probability distribution for an analog signal and the corresponding 5-bit sampled output words using sign-magnitude, straight binary, and two's complement format.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
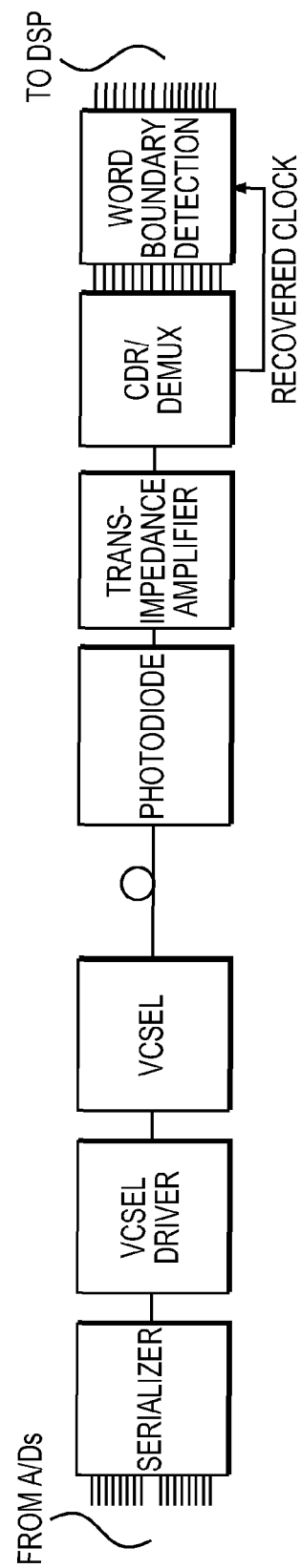
FIG. 1 is a simplified block diagram of a minimal-transmit-overhead photonic link.

FIG. 1 depicts an embodiment of a block diagram of a point-to-point fiber-optic digital data link having minimal processing overhead on the transmit side. Unlike conventional digital fiber-optic links, which employ power-intensive formatting, framing, and encoding operations at the transmitter to manage and maintain the link, the unique statistical characteristics of, for example, radio astronomy 'noise' renders many of these techniques unnecessary, and allows the maintenance of the link to be performed entirely at the receive-end using the data itself as the diagnostic input.

Bit-scramblers, for example, are not needed to guarantee logic-level transitions for clock-recovery. The noise from the receiver alone will be sufficient to ensure transitions in the data with sufficient frequency.

The algorithm begins after clock recovery at the receive-end of a data transmission link by breaking the bit stream down into word-length segments at an arbitrary boundary. Words can be any grouping of bits, symbols, or signals. Furthermore, words can be in binary or another numbering system. The format of each word can be sign plus magnitude, straight binary, offset binary, two's complement, one's complement, floating point, Gray code or other format. Words can come from one source or multiple courses. If the words come from multiple sources they can be interleaved. The bit-positions within these segments are then given points based on whether they satisfy a Boolean logical test relating each bit to its neighbors. The logical test itself is specific to the format of the words (offset binary, two's complement, sign-magnitude, etc.) The scores are tallied over some predetermined large number of words, and the bit position with the highest score is determined to be the Most Significant Bit (MSB) in the word. The segments in the data stream may then be re-aligned as words by a simple delay buffer or shift register.

In a common application where the sampled data has a Gaussian probability distribution and the spectral content is an approximation of white noise, the algorithm works because the logical test has been crafted to score twice as often on the MSB than it is on any other bit in the word. Simulations and measurement performed on actual broadband radio frequency data with realistic passband shapes and moderately strong man-made radio frequency signals show that these non-ideal characteristics do not alter the statistics sufficiently to disrupt the algorithm. Further, this invention is not limited to use with data with Gaussian probability distribution, nor is the spectrum of the signal required to be white. Any data set with distinguishing and stable statistics which differ according to the bit position within the data word is a candidate for application of this invention. Other examples of candidate signals with known statistical properties that can be exploited in this way include in-situ sensor readouts, active radar, sonar, or lidar returns, or generally scans of any kind of passive or stimulated emission. If the data set is collected by active stimulation (such as a radar), the active signal can be continuous wave, pulsed, chirped, modulated, or multi-frequency, and it may be synthesized locally (monostatic), remotely (bistatic), or by other ambient sources (opportunistic). The specific logic tests used by the algorithm to discriminate the bits in a stream of words will differ from one application to the next, but their derivation would be relatively straightforward to a person skilled in the art once the properties of the signal are known.

In the preferred embodiment, it is assumed that the size of the word in bits is known a priori. Since all sample values are theoretically possible, albeit with varying likelihood, examination of a single word-length is not sufficient to reliably determine the offset of the word boundaries in the data. Instead, a large number of word-lengths will have to be processed in order to accumulate statistical certainty before a positive detection is made and the required bit-shift is put in place. The link may then be considered synchronous with respect to word boundaries.

Two assumptions are made about the analog signal statistics. First, that it is noisy (random) with a Gaussian-distribution, and second, that it is white, guaranteeing that consecutive samples are uncorrelated. It is worth acknowledging briefly that neither of these conditions is strictly true in an exact sense. The spectrum will inevitably include non-Gaussian components at some level, and there will always be some variation in noise power across the source instrument's instantaneous bandwidth due to band-limiting filters, RFI, and the signal of interest.

Under these assumptions, the probability distribution of the analog signal voltage for any sample is given by $$p(v) = \frac{1}{\sigma\sqrt{2\pi}} \exp\left(-\frac{(v-\mu)^2}{2\sigma^2}\right) \qquad (1)$$

where $v$ is the instantaneous analog voltage, $\mu$ is the mean value, and $\sigma^2$ is the variance. The probability that the signal will fall between $v_1$ and $v_2$ at any one instant is given by $$\int_{v_1}^{v_2} p(v)dv = \frac{1}{\sigma\sqrt{2\pi}} \int_{v_1}^{v_2} \exp\left(-\frac{(v-\mu)^2}{2\sigma^2}\right) dv \qquad (2a)$$

$$= \frac{1}{\sqrt{\pi}} \int_{\frac{v_1-\mu}{\sigma\sqrt{2}}}^{\frac{v_2-\mu}{\sigma\sqrt{2}}} e^{-t^2} dt \qquad (2b)$$

$$= \frac{1}{2}\mathrm{erf}\left(\frac{v_2-\mu}{\sigma\sqrt{2}}\right) - \frac{1}{2}\mathrm{erf}\left(\frac{v_1-\mu}{\sigma\sqrt{2}}\right) \qquad (2c)$$

These probabilities have been tabulated in FIG. 2 for 32 bins using the normalization $$a = \frac{v_{max} - v_{min}}{2\sigma\sqrt{2}} = \frac{v_0 2^N}{2\sigma\sqrt{2}} = \frac{v_0 2^{N-1}}{\sigma\sqrt{2}} \qquad (3)$$

where $v_{max}-v_{min}$ is the analog input range of the sampler, $v_0$ is the threshold voltage for each level, and N is the number of bits per sample. It has further been assumed that there is no offset from center. Small offset errors, less than one sampler threshold, should not affect the statistics appreciably. On the right side of the figure are the 5-bit binary representations of the sampler output in several binary formats. This diagram is for illustration only, as no assumptions are made at this stage about the number of bits per word.

Finally, it is assumed without loss of generality that the data is serialized in "little-endian" fashion, meaning that the least significant bit in each word, $b_0$, is transmitted first, followed by the other bits, $b_1 \ldots b_{N-1}$, in order of increasing significance. This is the most common convention for digital serial links, however the analysis that follows applies equally-well to "big-endian" data streams, provided the bits are processed in the reverse order, and where the text makes reference to the "preceding" or "following" word in a sequence, the opposite sense is understood instead.

The algorithm is as follows. The incoming serialized data stream is divided into N-bit chunks, where N is the number of bits per word. These usually will not represent actual samples, since the word boundaries have not yet been detected. The goal of the algorithm is to determine the offset of the actual N-bit samples within the N-bit chunks. For each bit position within a chunk, a score is given. The bit position receives 1 point if a specified logical test is TRUE, and 0 points if the test result is FALSE. The test will depend on the binary format used. The score is then tallied over some large number of chunks, M, and the bit position with the highest score is declared the most significant bit (MSB) of the actual samples.

In a preferred embodiment, the serialized data is converted into parallel data. The parallel data is realigned, for example by a shift, a rotation, a delay, and/or a buffer. Prior to this, the data can be transmitted through a medium, for example the medium can be a transmission line, an optical fiber, a coaxial cable, or free space. Alternatively, the medium may be a wave guide and the wave guide is one of rectangular, circular, elliptical, or ridged.

The performance of the above algorithm can be evaluated by first considering the probability that a given bit will yield a TRUE in the logical test defined for the given binary format. Denote this probability for bit k in the actual samples as $p_k$.

The point awarded to bit k in chunk i is then a Bernoulli Distributed random variable, $X_{i,k}$, with mean and variance given by $$E\{X_{i,k}\} = p_k \tag{4a}$$

$$\text{Var}\{X_{i,k}\} = p_k(1-p_k) \tag{4b}$$

(Note that the index k refers to the significance of the bit in the actual samples, where k=0 corresponds to the least significant bit and k=N−1 corresponds to the most significant bit. The position of these bits within chunk, i, is unknown until completion of the algorithm.)

The score, $Y_k$, for bit position k after tallying M chunks is $$Y_k = \sum_{i=1}^{M} X_{i,k} \tag{5}$$

By the Central Limit Theorem, we know that for large M the probability distribution of Y is Gaussian, with mean and variance given by $$E\{Y_k\} = Mp_k \tag{6a}$$

$$\text{Var}\{Y_k\} = Mp_k(1-p_k) \tag{6b}$$

The probability of the algorithm failing, $P_f$, is the probability that the score for the MSB is smaller than for one of the other bits, $$P_f = \tag{7a}$$

$$P\{Y_{N-1} \leq Y_k \mid k < N-1\} \cong \frac{1}{2}\sum_{k=1}^{N-2} \text{erfc}\left(\frac{E\{Y_{N-1}\} - E\{Y_k\}}{\sqrt{2(\text{Var}\{Y_{N-1}\} + \text{Var}\{Y_k\})}}\right)$$

$$= \frac{1}{2}\sum_{k=1}^{N-2} \text{erfc}\left(\frac{\sqrt{M}\,(p_{N-1} - p_k)}{\sqrt{2(p_{N-1}(1-p_{N-1}) + p_k(1-p_k))}}\right) \tag{7b}$$

The approximation holds when the probability of failure is small, and is conservative (that is, it overestimates the probability of failure by double-counting the cases where more than one wrong bit has a higher score than the most significant bit.) A useful upper bound for the complementary error function is $$\text{erfc}(x) = < \frac{2e^{-x^2}}{\sqrt{\pi}\left(x + \sqrt{x^2 + \frac{4}{\pi}}\right)},\; x > 0 \tag{8}$$

Below, the performance of this algorithm is evaluated for three common binary formats: sign-magnitude, straight binary, and two's complement.

Sign-Magnitude

Although sign-magnitude notation is rarely used in this context, it is a fairly simple case to analyze, so it will be treated here for completeness.

First, a logical test that preferentially results in TRUE when applied to the sign bit (which is considered the most significant for the purposes of this analysis) is defined.

It is evident from inspection of FIG. 2 that the most significant bit after the sign bit is almost always zero near the center of the voltage scale, in the sample words with the highest probability of occurrence. The latter bits take on the value zero with lesser frequency. "$b_{k-1}=0$" may therefore seem to be a good logical test for scoring each bit, however since all the high order bits assume a value of zero with high probability, that test doesn't discriminate between the bits very well, especially at low analog power levels where only the inner most sample codes are ever used. Several bit positions could easily end up with almost identical scores. Instead, the test criterion that the current bit, $b_k$, is also be equal to one is added. Although the sign bit fails this test roughly half the time, it fails the first few high order bits with greater regularity. Therefore, $$X_{i,k}^{sm} = \begin{cases} 1, & b_k = 1, b_{k-1} = 0 \\ 0, & \text{else} \end{cases} \tag{9}$$

where the superscript "sm" refers to the sign-magnitude format. Throughout this document, subscripts shall be understood to be cyclic, so that $$b_{k<0} = b_{k+N} \tag{10}$$

The bits which pass the test in Equation (9) are boxed in the figure, solid if the bit pattern is contained within the word, and dashed if it crosses over a word boundary. The probability of a given bit receiving a point is $$p_k^{sm} = P\{b_k = 0\} \tag{11}$$

and can be read off of FIG. 2 for particular cases as follows $$p_{N-1}^{sm} = \frac{1}{2}\text{erf}\left(\frac{1}{2}a\right) \tag{12a}$$

$$p_{N-2}^{sm} = \text{erf}\left(\frac{3}{4}a\right) - \text{erf}\left(\frac{1}{2}a\right) \tag{12b}$$

$$p_{N-3}^{sm} = \text{erf}\left(\frac{7}{8}a\right) - \text{erf}\left(\frac{3}{4}a\right) + \text{erf}\left(\frac{3}{8}a\right) - \text{erf}\left(\frac{1}{4}a\right) \tag{12c}$$

Figure 3:
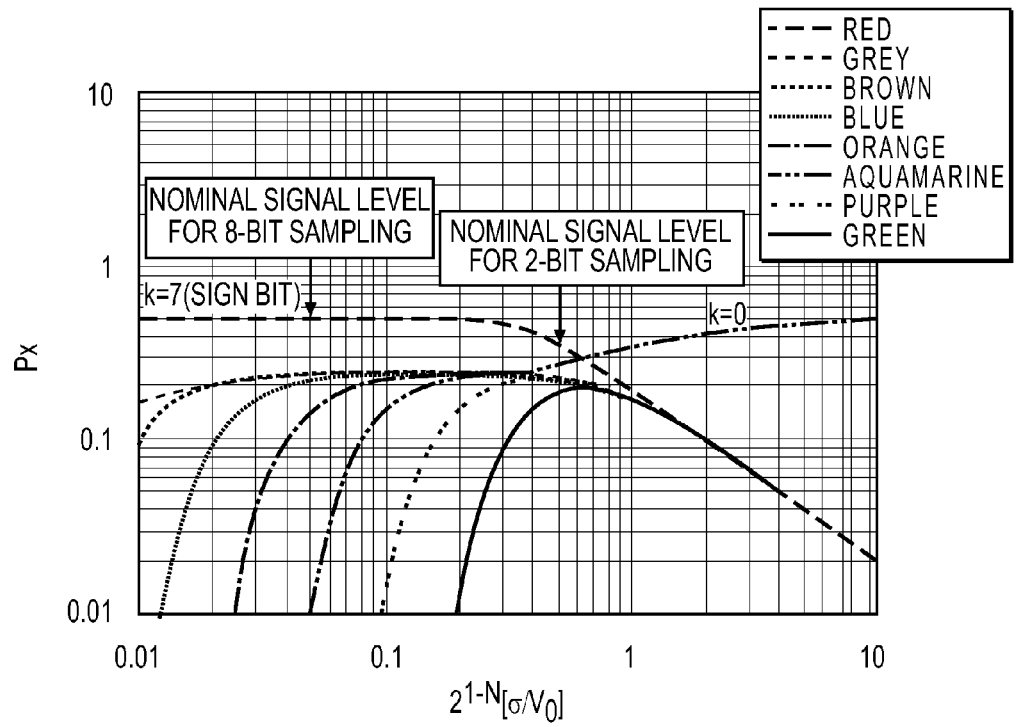
FIG. 3 is a plot of the scoring probability for sign-magnitude format. N=8 bits. The abscissa may be interpreted as the average voltage swing of the signal ($2\sigma$) divided by the full-scale range of the sampler ($2^N v_0$).

By recognizing the above pattern, a formula for the more general case can be written as $$p_{N-1-s}^{sm} = \begin{cases} \frac{1}{2}\text{erf}\left(\frac{1}{2}a\right) & s = 0 \\ \sum_{i=1}^{2^{s-1}} \left[\begin{array}{l}\text{erf}\left(2^{-s}\left(2i - \frac{1}{2}\right)a\right) - \\ \text{erf}(2^{-s}(2i-1)a)\end{array}\right] & 1 \leq s \leq N-2 \\ \frac{1}{2} - \frac{1}{2}\sum_{i=1}^{2^{(N-2)}} \left[\begin{array}{l}\text{erf}(2^{-N}(4i-2)a) - \\ \text{erf}(2^{-N}(4i-4)a)\end{array}\right] & s = N-1 \end{cases} \tag{13}$$

where the first case, s=0, corresponds to the sign bit. This is plotted in FIG. 3 as a function of signal strength.

Note that when the signal strength is very high, the probability of the sign bit scoring a point drops off rapidly. This corresponds to the saturation of the sampler, in which case the outermost sample codes begin to occur even more frequently than those in the center. The algorithm will fail in that situation. This is not a useful operating point for the sampler, however, and should almost never occur in practice. The nominal signal strength for radio astronomy is usually optimized for quantization noise, which in most cases will put the operating point on the left side of the plot, well below the saturation crossover point, where there is a strong statistical bias for the sign bit. A notable exception is two-bit sampling (N=2), which will be discussed below.

Straight Binary

Sampler output codes in straight binary (or offset binary) format are shown in the second column of FIG. 2. The patterns of 0's and 1's have odd symmetry about the center of the probability distribution, so any bit, no matter what the bit's significance, will assume both values with equal probability. Therefore, the method described above for the sign-magnitude case will not apply.

Instead, it is noted that in the most likely sampler outputs, those in the center of the sampler range, the two most significant bits differ, whereas the next few bits are the same. Therefore, the logical test used for the straight binary case is that the current bit differs from the preceding bit, $$X_{i,k}^{sb} = \begin{cases} 1, & b_k \neq b_{k-1} \\ 0, & b_k = b_{k-1} \end{cases} \quad (14)$$

As above, the probability of given bit scoring a point can be read off the figure $$p_{N-1}^{sb} = \mathrm{erf}\left(\frac{1}{2}a\right) \quad (15a)$$

$$p_{N-2}^{sb} = \mathrm{erf}\left(\frac{3}{4}a\right) - \mathrm{erf}\left(\frac{1}{4}a\right) \quad (15b)$$

$$p_{N-3}^{sb} = \mathrm{erf}\left(\frac{7}{8}a\right) - \mathrm{erf}\left(\frac{5}{8}a\right) + \mathrm{erf}\left(\frac{3}{8}a\right) - \mathrm{erf}\left(\frac{1}{8}a\right) \quad (15c)$$

or in other words, $$p_{N-1-s}^{sb} = \sum_{i=1}^{2^s} (-1)^{i-1} \mathrm{erf}\left(\left(1 - 2^{-s}\left(i - \frac{1}{2}\right)\right)a\right) \quad (16)$$

where $$0 \leq s \leq N-2. \quad (17)$$

When s=N−1, the two bits being compared extend over a word boundary between the current word and the previous word (using little-endian bit order). The probability of the two bits differing in this case is simply one half, owing to the fact that 0's and 1's are equally likely in all bit positions and subsequent words in the data stream are uncorrelated. Therefore, $$p_{N-1-s}^{sb} = \begin{cases} \sum_{i=1}^{2^s} (-1)^{i-1} \mathrm{erf}\left(\left(1 - 2^{-s}\left(i - \frac{1}{2}\right)\right)a\right) & 0 \leq s \leq N-2 \\ 0.5 & s = N-1 \end{cases} \quad (18)$$

Figure 4:
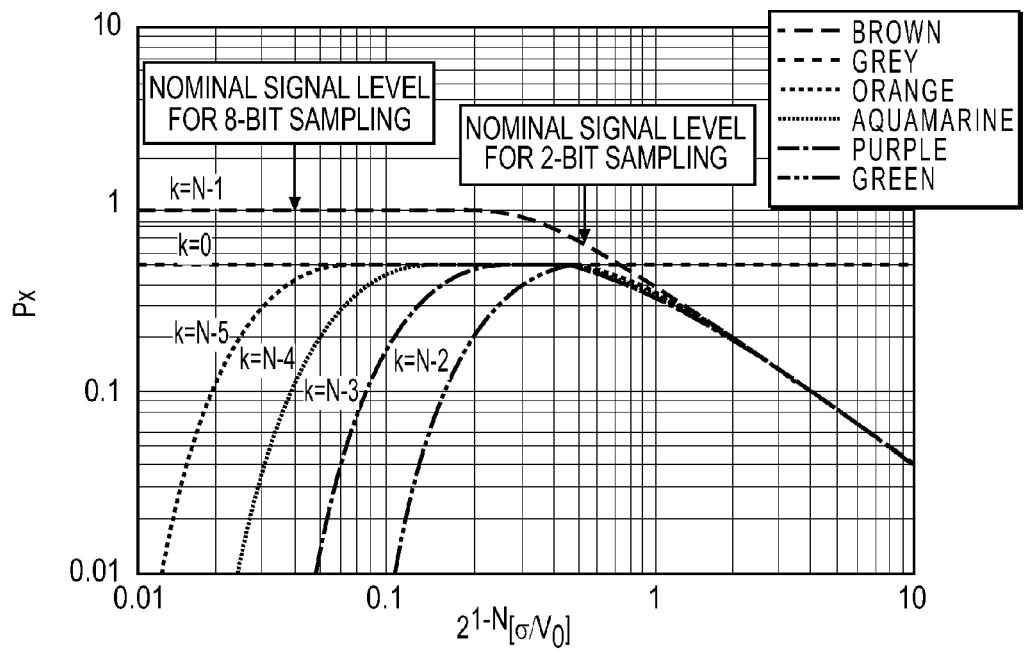
FIG. 4 is a plot of the scoring probability for straight binary format. N is arbitrary. The abscissa may be interpreted as the average voltage swing of the signal ($2\sigma$) divided by the full-scale range of the sampler ($2^N v_0$).

This is plotted in FIG. 4, which clearly shows a strong statistical bias for the most significant bit (k=N−1) to the left of the saturation crossover point.

Two's Complement

The sample codes for two's complement notation are shown in the final column of FIG. 2. Unlike straight binary, the first two bits are equal in the most common samples rather than different. In fact, that is the only difference between the straight binary and two's complement sample codes. The logical test for two's complement then will be that the current bit matches the preceding bit, and does not match the following bit, $$X_{i,k}^{tc} = \begin{cases} 1, & b_k = b_{k-1} \neq b_{k+1} \\ 0, & \text{else} \end{cases} \quad (19)$$

Once again, the probability of a bit scoring is easiest to read off the figure, $$p_{N-1}^{tc} = \mathrm{erf}\left(\frac{1}{2}a\right) \quad (20a)$$

$$p_{N-2}^{tc} = 1 - \mathrm{erf}\left(\frac{3}{4}a\right) \quad (20b)$$

$$p_{N-3}^{tc} = \mathrm{erf}\left(\frac{5}{8}a\right) - \mathrm{erf}\left(\frac{3}{8}a\right) \quad (20c)$$

$$p_{N-4}^{tc} = \mathrm{erf}\left(\frac{13}{16}a\right) - \mathrm{erf}\left(\frac{11}{16}a\right) + \mathrm{erf}\left(\frac{5}{16}a\right) - \mathrm{erf}\left(\frac{3}{16}a\right) \quad (20d)$$

The general equation for s≥2 is, $$p_{N-1-s}^{tc} = \begin{cases} \sum_{i=1}^{2^{s-2}} \left[ \mathrm{erf}\left(2^{-s}\left(4i - \frac{3}{2}\right)a\right) - \mathrm{erf}\left(2^{-s}\left(4i - \frac{5}{2}\right)a\right) \right] & 2 \leq s \leq N-2 \\ \sum_{i=1}^{2^{N-3}} \left[ \mathrm{erf}(2^{-N}(8i-2)a) - \mathrm{erf}(2^{-N}(8i-6)a) \right] & s = N-1 \end{cases} \quad (21)$$

Figure 5:
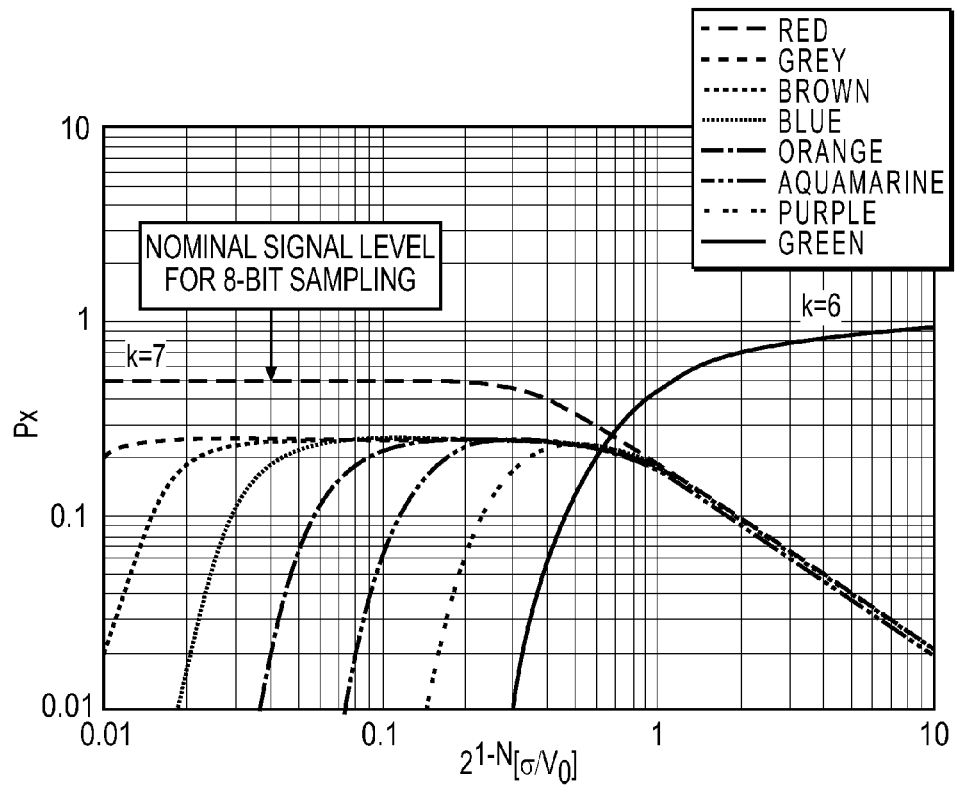
FIG. 5 is a plot of the scoring probability for two's complement format. N=8 bits. The abscissa may be interpreted as the average voltage swing of the signal ($2\sigma$) divided by the full-scale range of the sampler ($2^N v_0$).

These probabilities are plotted in FIG. 5.

Figure 6:
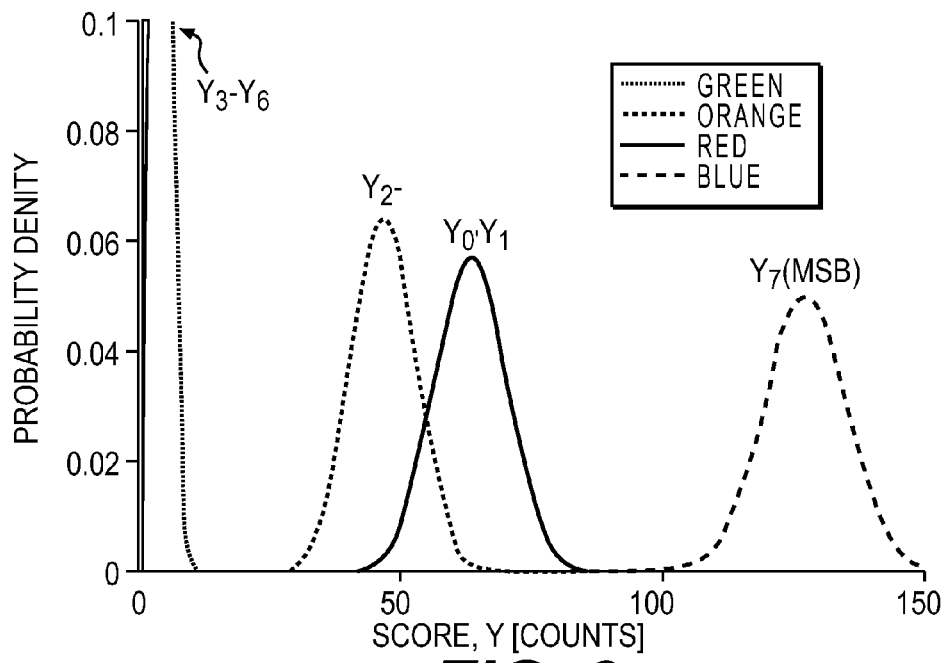
FIG. 6 depicts probability distributions of scores for 8-bit, two's-complement data using the described algorithm with $\sigma=5v_0$ and M=255 words counted.

The above algorithm works reliably so long as the logical tests provide a strong statistical bias for the MSB, which is usually the case for nominal signal levels in radio astronomy. As an example, the probability distributions of scores for 8-bit, two's-complement data, with $\sigma=5v_0$, and M=255 words counted are shown in FIG. 6. The bell curve for the MSB (k=7) is well to the right of all the others. In this case, the chances of failure, as calculated using Equation (7), are less than $7 \times 10^{-7}$.

Figure 7:
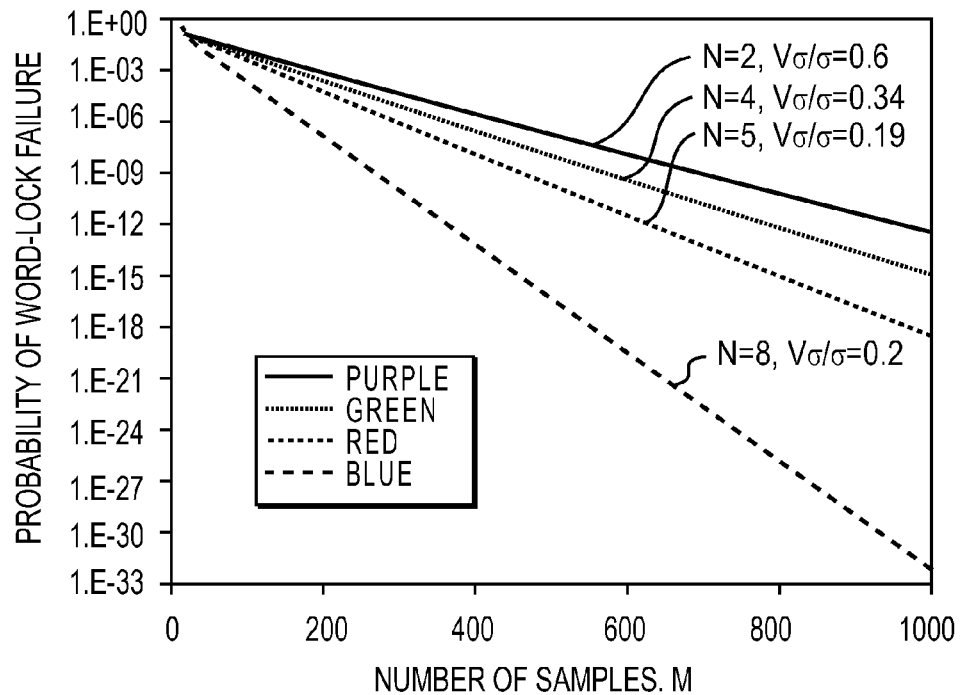
FIG. 7 depicts the probability of the algorithm failing (locking onto the incorrect bit) as a function of samples counted, M, for a number of common use cases in two's-complement format.

The reliability improves exponentially with the number of words counted, as shown in FIG. 7 for a number of common-use cases. In all of these cases, the nominal signal level for optimum quantization noise is well below the saturation cross-over point.

Figure 8:
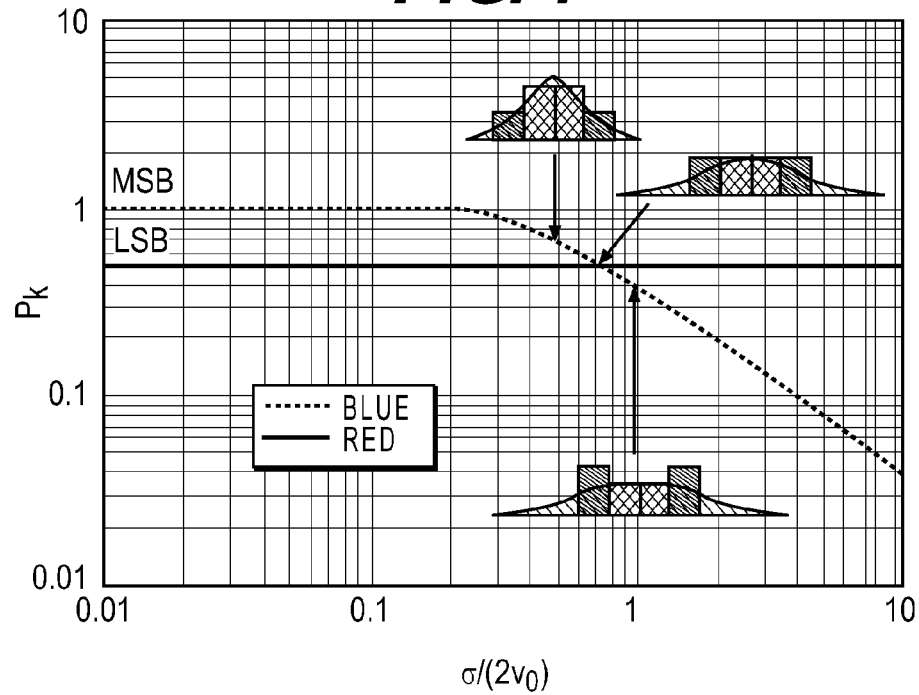
FIG. 8 is a plot of the scoring probability when N=2. The result is the same for all binary formats. The insets show the Gaussian distribution of the analog signal at different power levels and the corresponding probabilities in the four sampler bins.

The only case in radio astronomy which comes close to saturating the sampler is when two-bit sampling is used. The probability of bits scoring for N=2 is shown in FIG. 8. This plot is the same for all binary formats. The optimum level for quantization noise using two-bit sampling is approximately σ=$v_0$ (on the plot, σ/$2v_0$=0.5). The algorithm will work in this situation, but the statistical margin has been reduced relative to all the cases discussed so far, so a somewhat larger number of samples will have to be counted to achieve the same level of reliability.

FIG. 8 shows that as the signal level increases beyond that point, the long tail of the Gaussian curve for the analog signal builds up the probability of occurrence of the outer two sample codes until they become even more likely to occur than the innermost codes. These codes are identical to the innermost codes except shifted by 1 bit. Under these conditions, the algorithm will fail by locking on the wrong bit.

In practice, if there is any fear of the sampler being in saturation when the word-boundary detection algorithm is running, an easy fix would be to simply bias down the front-end amplifiers before doing so, dropping the gain of the system and pushing the analog signal level to the far left side of the plot. Once word-lock is established, the gain could be turned back on.

The algorithm consists of scoring the bits in the data stream with a periodicity of N, where N is the word-length in bits, and then selecting as the most significant bit the one which receives the highest score after some large number of samples. The condition under which bit $b_k$ receives a point depends on the binary format, and is as follows, sign-magnitude: $b_k=1$, $b_{k-1}=0$
straight binary: $b_k \neq b_{k-1}$
two's complement: $b_k = b_{k-1} \neq b_{k+1}$ With this invention, management of the digital serial link can be performed entirely at the receive end, without any special formatting taking place at the transmit end. This permits the size, complexity, and power consumption of the transmit electronics for a digital link to be substantially reduced. For typical applications using off-the-shelf components, it may consist solely of an Analog-to-Digital Converter (ADC), a serializer, a laser driver, and a laser. If a custom ADC with serial output was manufactured, the serializer could also be eliminated. This invention obviates the need for the ADC to use line codes that insert comma symbols or other controls to aid in word alignment. This enables certain applications to realize the benefits of digital transmission where only an analog link could be used before. In many applications, as in radio astronomy, it is very common for power, size, and weight restrictions to be much more severe where data sampling must occur than at the receive end of a data link where data processing and storage takes place. The algorithm can be implemented in software or firmware at the receiving end. Preferably, the algorithm is hard coded in a logic device such as deserializer, a demultiplexer, a universal asynchronous receiver/transmitter (UART), or other processor.

The algorithm can be used, for example, with a SONAR, a RADAR, a radiometer, a reflectometer, a polarimeter, a wireless transmitter, a cell phone, a spectrometer, a correlator, a data recorder, an imaging camera, or another transmitter, receiver, or transceiver. In a preferred embodiment, a data transmission link is used to transmit the data set. The data transmission link preferably has a transmit end and a receive end. The transmit end can include one or more of an Analog-to-Digital Converter (ADC), a serializer, a laser driver, and a laser, while the receive end can include one or more of a photodiode, a transimpedance amplifier, a deserializer, an application specific integrated circuit (ASIC), a complex programmable logic device (CPLD), or a field programmable gate array (FPGA).

In a preferred embodiment, the output of the ADC is serial, and has not been otherwise encoded for word alignment. The ADC can be one of direct conversion or flash, successive approximation, ramp-compare, Wilkinson, Integrating, delta-encoded, pipeline, Sigma-Delta, time interleaved, and time-stretch. The output of the ADC can be copper, optical fiber, free space, or another medium capable of transmitting a signal. Preferably, the bit resolution is adjustable.

The following examples illustrate embodiments of the invention, but should not be viewed as limiting the scope of the invention.

EXAMPLES

To validate the algorithm, as well as demonstrate the effects of RFI and other non-Gaussian, non-white effects on the algorithm, actual data from radio astronomy receivers was analyzed. The data was scored according to the logical tests prescribed by the algorithm and the results averaged for each bit. Multiple signal levels were simulated from the same data set by clipping the waveform and truncating the bits. The results are shown in FIG. 9 through FIG. 12. Each data point represents the average over 100,000 samples.

Figure 9:
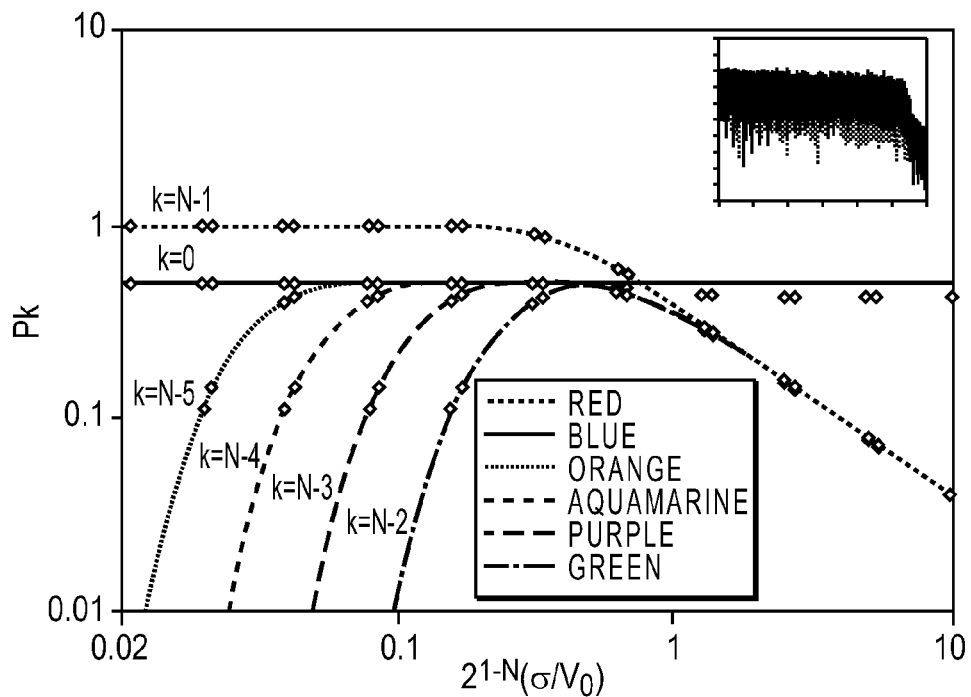
FIG. 9 depicts theoretical (lines) and measured (markers) scoring probability for straight-binary data with no CW components. The spectrum of the data stream used for the measurement is shown in the upper-right corner.

FIG. 9 is the scoring probability for the data without any CW components, as shown in the spectrum in the upper-right corner. The markers, representing real data, fall on top of the theoretical curves over most of the dynamic range of the plot. Only the k=0 bit deviates slightly at the right side of the plot where the waveform is beginning to clip. This is the bit for which the logical test ($b_k \neq b_{k-1}$) crosses over a word boundary. The theoretical curve for k=0 is based on the assumption that the noise is white, so there is no correlation between successive samples. The deviation seen in the measurement is probably due to the "color" of the spectrum, or in other words the gain slope at the high end of the band. With the higher-frequency components dropping off in amplitude, the correlation between adjacent samples is small but positive (so the chances of a 'mismatch' across the word boundary are less).

Figure 10:
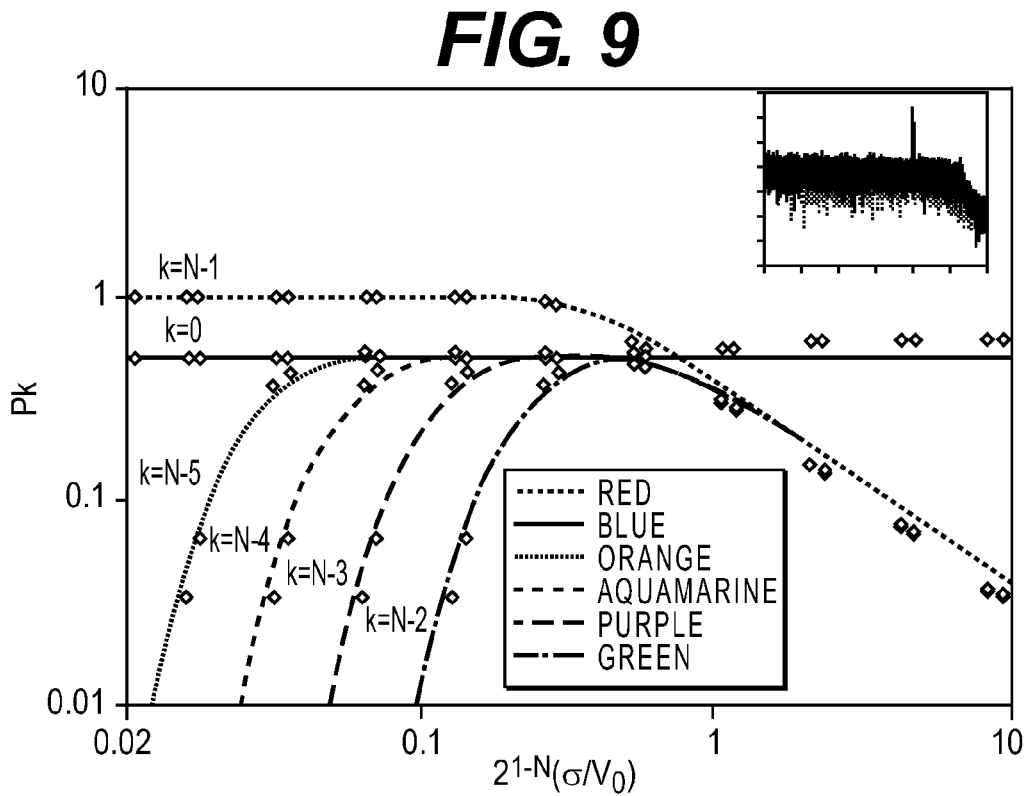
FIG. 10 depicts theoretical (lines) and measured (markers) scoring probability for straight binary data with a high-band CW component. The spectrum of the data stream used for the measurement is shown in the upper-right corner.

FIG. 10 shows the scoring probability for a spectrum which contains a strong, high-frequency, CW tone. The strength of the CW tone roughly doubles the total integrated power in the spectrum. In this case, the k=0 bit has a higher probability of scoring at large signal levels than predicted, due to the small but negative correlation between adjacent samples. The remaining bits also drop off in scoring probability at the far right of the plot somewhat faster than expected, but overall the agreement between measurement and theory is quite good.

Figure 11:
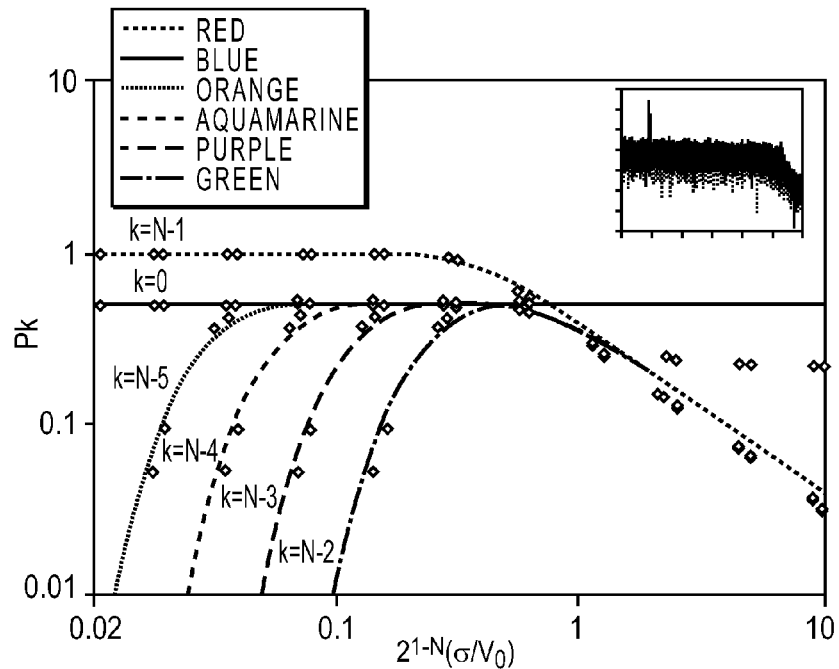
FIG. 11 depicts theoretical (lines) and measured (markers) scoring probability for straight binary data with a low-band CW component. The spectrum of the data stream used for the measurement is shown in the upper-right corner.

FIG. 11 shows the scoring probability for a spectrum which contains a strong, low-frequency CW tone. Again, the strength of the CW tone is roughly equal to the noise power in the spectrum, and therefore doubles the total integrated power in the data stream. Here, the strong low-frequency component creates a positive correlation coefficient between successive samples, and the k=0 bit deviates toward lower-probability at high signal levels.

Figure 12:
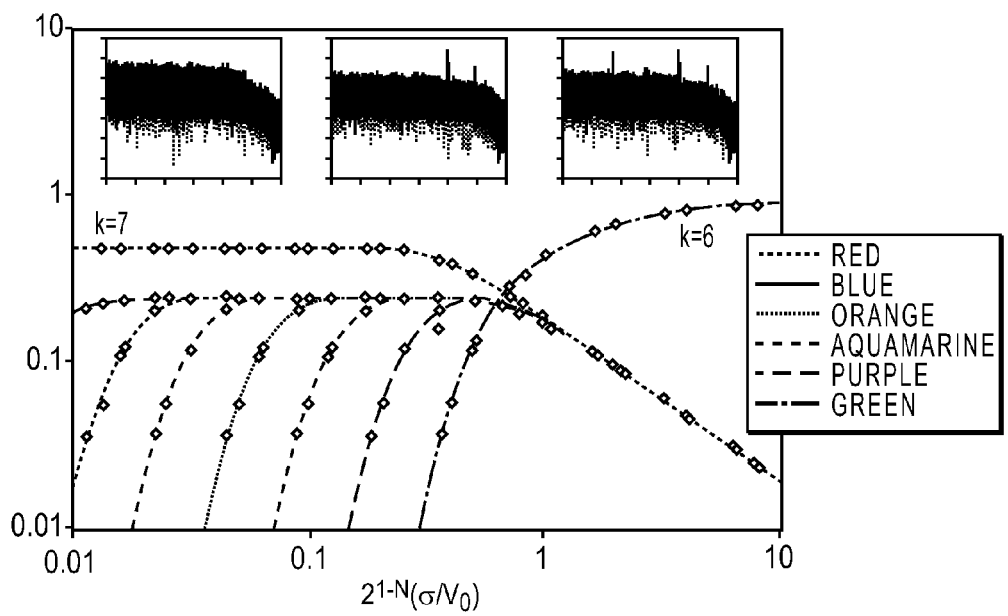
FIG. 12 depicts theoretical (lines) and measured (markers) scoring probability for two's-complement data. Data points were taken from multiple spectra, including some with low-band, mid-band, and high-band CW tones injected, as well as from the L-Band front-end on the Green Bank Telescope in which significant levels of RFI were present. Some of the spectra are shown across the top of the plot.

Finally, FIG. 12 shows the theoretical and measured scoring probability for two's complement data streams taken from a number of different spectra, including some with low-, mid-, and high-band CW injected tones, and some using the L-Band front-end on the Green Bank Telescope for which high levels of broadband RFI are present. In all of these cases, however, the non-ideal components were too weak to cause a statistically significant deviation from the theoretical prediction.

Overall, despite some measurable effects due to very strong non-Gaussian components and non-white bandpass shape, the agreement between measurement and theory is excellent, especially over the dynamic range for which the algorithm operates.

Operationally, the word-boundary detection algorithm described above could be used in a number of different ways, depending on the application. For example, it may be run continuously, re-zeroing the counters for each bit position whenever any of them becomes full, or it may be run periodically at pre-determined intervals. The window over which scores are tallied may comprise all of the bits in a given interval, or only a subset, and the scoring windows may overlap. If a different bit position is identified as the most significant bit (MSB) than was identified on the previous iteration, a flag may be raised indicating that bit slip has occurred. One may then simply discard the data from the previous two intervals (since the slip may have occurred during the current interval or partway through the prior interval) or the data may be buffered and reprocessed with a sliding window to better locate the slip.

Figure 13:
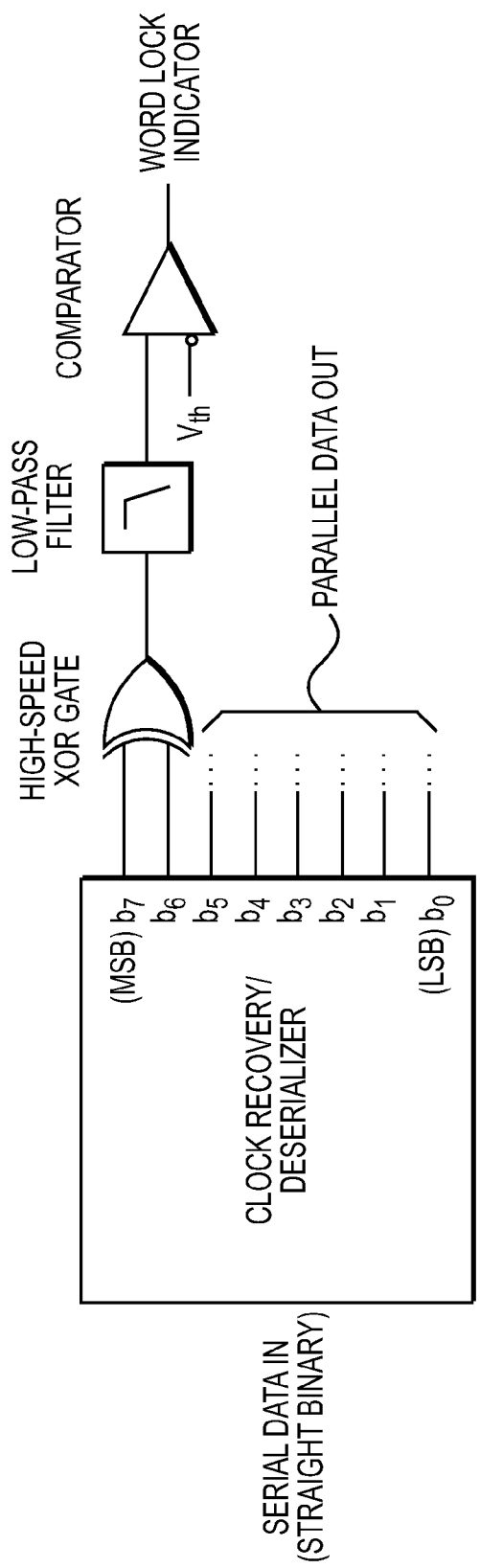
FIG. 13 depicts one possible implementation of the word boundary detection system for straight/offset binary using a high-speed XOR gate, an analog low-pass filter, and a comparator.

In some embodiments, the scores pertaining to each bit position may be tallied by digital logic. In other embodiments, a measure of the scoring probability may be estimated using analog means. For example, consider the Boolean logical test for straight/offset binary ($b_k \neq b_{k-1}$). This can be evaluated for any and all bit positions as the data streams in with a single, high-speed exclusive-OR (XOR) gate, as shown in FIG. 13. The fast binary output stream of this logic gate may then be averaged simply by an analog low-pass filter, or leaky integrator. The output voltage of this filter, relative to the logic rails of the XOR gate, will be proportional to the average scoring probability for the bit position to which it is applied. A comparator is then all that is needed to determine whether the parallel output stream is aligned, by comparing this voltage score against a pre-determined decision threshold, $V_{th}$.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. A method, comprising one or more processors:
obtaining a data set, wherein the data set comprises words, and the words comprise symbols;
inferring boundaries between words using statistical properties of the data set, wherein the statistical properties of the data set are derived from a logic test algorithm performed entirely at the receive-end using the data itself as the data is obtained, and wherein the boundaries between words are identified by Boolean logical tests applied to adjacent symbols in the data set; and
outputting the data set with the word boundaries identified.

2. The method of claim 1:
wherein the number of symbols per word is constant; and
wherein the number of symbols per word is inferred using the statistical properties of the data set.

3. The method of claim 1:
wherein the number of symbols per word is dynamic; and
wherein the number of symbols per word is inferred using the statistical properties of the data set.

4. The method of claim 1, wherein the data set is in a serial format.

5. The method of claim 4, wherein the serial data is in one of little-endian or in big-endian order.

6. The method of claim 4, further comprising converting the serial data to parallel data.

7. The method of claim 6, further comprising realigning the parallel data by one of a shift, a rotation, a delay, and a buffer.

8. The method of claim 1, wherein the symbols are binary digits or bits.

9. The method of claim 1, wherein the format of the words is one of sign plus magnitude, straight binary, offset binary, two's complement, one's complement, floating point, and Gray code.

10. The method of claim 1, wherein the words are of a known fixed length.

11. The method of claim 1, wherein the data set is divided into groups of symbols of the same length as the words.

12. The method of claim 11, further comprising assigning a score to the symbol positions in each group based on the Boolean logical test.

13. The method of claim 12, wherein the Boolean logical test is evaluated by one or more high-speed logic gates.

14. The method of claim 13, wherein output of the high-speed logic gate is passed through a low-pass filter or leaky integrator.

15. The method of claim 14, wherein output of the integrator is compared to a decision threshold with a comparator to determine word boundary alignment.

16. The method of claim 12, further comprising accumulating the scores over a finite number of groups.

17. The method of claim 16, further comprising identifying a single symbol position by the accumulated scores, and inferring that the single symbol position occupies a single position within the words of the data set.

18. The method of claim 17, wherein the inferred position is one of the most significant digit, the least significant digit, and the sign digit.

19. The method of claim 18:
wherein the data set comprises binary words in sign plus magnitude format;
wherein the Boolean logical test is $$(b_k=1)\char`\^(b_{k-1}=0); \text{ and}$$

wherein $b_k$ is the value of bit k, $b_{k-1}$ is the value of an adjacent bit, and the bit position with the highest final score is inferred to be the sign digit.

20. The method of claim 18:
wherein the data set comprises binary words in straight binary or offset binary format;
wherein the Boolean logical test is $$b_k \neq b_{k-1}; \text{ and}$$

wherein $b_k$ is the value of bit k, $b_{k-1}$ is the value of an adjacent bit, and the bit position with a highest final score is inferred to be the most significant bit.

21. The method of claim 17, wherein the data set comprises binary words in two's complement format:
wherein the Boolean logical test is $$(b_k=b_{k-1})\char`\^(b_k \neq b_{k+1}); \text{ and}$$

wherein $b_k$ is the value of bit k, wherein $b_{k-1}$ and $b_{k+1}$ are the values of adjacent bits, and the bit position with the highest final score is inferred to be the most significant bit.

22. The method of claim 17, wherein the scores are tallied continuously.

23. The method of claim 17, wherein the data set is divided into intervals.

24. The method of claim 23, wherein the scores are accumulated over a subset of the word-length groups in each interval.

25. The method of claim 24, wherein the scores are accumulated in overlapping sets of intervals.

26. The method of claim 1, further comprising transmitting the data set through a medium.

27. The method of claim 26, wherein the medium is one of a transmission line, an optical fiber, a coaxial cable, and free space.

28. The method of claim 26, wherein the medium is a waveguide.

29. The method of claim 28, wherein the waveguide is one of rectangular, circular, elliptical, or ridged.

30. The method of claim 1, wherein the power spectral density of the words is substantially equal to the power spectral density of white noise.

31. The method of claim 1, wherein the probability distribution of the words is substantially Gaussian.

32. The method of claim 1, wherein the words are samples output by an Analog to Digital Converter (ADC).

33. The method of claim 1, wherein the words from multiple sources are interleaved.

34. The method of claim 1, further comprising collecting the data set one of actively and passively.

35. The method of claim 1, wherein the data set is the output of one of a SONAR, a RADAR, a radiometer, a reflectometer, and a polarimeter.

36. A system comprising a processor,
wherein the system:
obtains a data set comprised of words, and the words comprised of symbols;
infers boundaries between words using statistical properties of the data set,
wherein the statistical properties of the data set are derived from a logic test algorithm performed entirely at the receive-end using the data itself as the data is obtained, and
wherein the boundaries between words are identified by Boolean logical tests applied to adjacent symbols in the data set; and
outputs the data set with the word boundaries identified.

37. The system of claim 36, further comprising a serializer.

38. The system of claim 36, further comprising optical fiber.

39. The system of claim 36, further comprising a data transmission link having a transmit end and a receive end.

40. The system of claim 39, wherein the transmit end comprises one or more of an Analog to Digital Converter (ADC), a serializer, a laser driver, and a laser.

41. The system of claim 39, wherein the receive end comprises one or more of a photodiode, a transimpedance amplifier, a deserializer, an Application Specific Integrated Circuit (ASIC), a Complex Programmable Logic Device (CPLD), and a Field Programmable Gate Array (FPGA).

42. The system of claim 36, wherein the system is one of a SONAR, a RADAR, a radiometer, a reflectometer, a polarimeter, a wireless transmitter, and a cell phone.

43. The system of claim 36, wherein the system is an imaging camera.

44. The system of claim 36, wherein the system is one of a transmitter, a receiver, and a transceiver.

45. The system of claim 36, further comprising one of a spectrometer and a correlator.

46. The system of claim 36, further comprising a data recorder.

47. An Analog to Digital Converter (ADC), comprising:
an analog input; and
a digital output;
wherein the output is in serial format; and
wherein the output is not encoded for word boundaries or word boundary alignment;
wherein no symbols or controls are added to aid in word boundary identification or word boundary alignment.

48. The ADC of claim 47, wherein the type of ADC is one of direct conversion or flash, successive approximation, ramp-compare, Wilkinson, Integrating, delta-encoded, pipeline, Sigma-Delta, time interleaved, and time-stretch.

49. The ADC of claim 47, wherein the ADC output medium is one of copper, optical fiber, and free space.

50. The ADC of claim 47, wherein the bit resolution is adjustable.

51. A method of identifying word boundaries, comprising a device:
obtaining a serial data stream, wherein the data stream comprises words, and the words comprise symbols;
inferring the boundaries between words using statistical properties of the data stream, wherein the statistical properties of the data stream are derived from a logic test algorithm performed entirely at the receive-end using the data stream itself as the data stream is obtained, and wherein the boundaries between words are identified by Boolean logical tests applied to adjacent symbols in the data stream; and
outputting the data stream with the word boundaries identified, wherein the device is one of a deserializer, a demultiplexer, and a universal asynchronous receiver/transmitter (UART).

52. The method of claim 51, wherein the data stream is divided into groups of symbols of the same length as the words, further comprising assigning a score to the symbol positions in each group based on the Boolean logical test, wherein the scores are accumulated over all the word-length groups in a given interval.

53. The method of claim 52, wherein a warning flag is raised in the event that a different symbol position is inferred from the scoring in a given interval than in a previous interval, indicating that a symbol slip may have occurred.

54. The method of claim 53, wherein the data of two previous intervals is discarded.

55. The method of claim 53, wherein the data of two previous intervals is reprocessed with a sliding scoring window to better localize the slip.

* * * * *